US011328343B1

(12) United States Patent
Chionna (10) Patent No.: US 11,328,343 B1
(45) Date of Patent: May 10, 2022

(54) SYSTEM AND METHODS FOR A SHARED SHOPPING EXPERIENCE

(71) Applicant: Enrico Chionna, San Francisco, CA (US)

(72) Inventor: Enrico Chionna, San Francisco, CA (US)

( * ) Notice: Subject to any disclaimer, the term of this patent is extended or adjusted under 35 U.S.C. 154(b) by 0 days.

(21) Appl. No.: 16/914,042

(22) Filed: Jun. 26, 2020

Related U.S. Application Data

(60) Provisional application No. 62/867,814, filed on Jun. 27, 2019, provisional application No. 62/867,816, filed on Jun. 27, 2019, provisional application No. 62/867,818, filed on Jun. 27, 2019.

(51) Int. Cl.
*G06Q 30/00* (2012.01)
*G06Q 30/06* (2012.01)
*G06Q 20/12* (2012.01)
*G06Q 30/02* (2012.01)

(52) U.S. Cl.
CPC ......... *G06Q 30/0635* (2013.01); *G06Q 20/12* (2013.01); *G06Q 30/0277* (2013.01); *G06Q 30/0643* (2013.01)

(58) Field of Classification Search
CPC ................... G06Q 30/02; G06Q 30/06; G06Q 30/0601–0645
USPC ................................................ 705/26.1–27.2
See application file for complete search history.

(56) References Cited

U.S. PATENT DOCUMENTS

| 7,783,980 | B1* | 8/2010 | Herold .................... H04L 51/10 715/740 |
|---|---|---|---|
| 8,099,109 | B2 | 1/2012 | Altman et al. |
| 8,190,474 | B2 | 5/2012 | Lerman et al. |
| 8,196,050 | B2 | 6/2012 | Riley et al. |
| 8,560,387 | B2 | 10/2013 | Amidon et al. |
| 8,768,766 | B2 | 7/2014 | Ellis et al. |
| 8,872,846 | B2 | 10/2014 | Kew et al. |
| 9,282,129 | B2 | 3/2016 | Leibovich et al. |
| 9,299,090 | B1 | 3/2016 | Tsypliaev et al. |
| 9,712,638 | B2* | 7/2017 | Allen .................... H04L 65/403 |
| 9,965,768 | B1 | 5/2018 | Doane et al. |
| 10,121,163 | B2* | 11/2018 | Salari ................ G06Q 30/0241 |
| 10,200,654 | B2 | 2/2019 | Szymczyk et al. |
| 10,235,688 | B2 | 3/2019 | Beatty et al. |
| 10,282,713 | B2 | 5/2019 | Ham |
| 10,546,326 | B2 | 1/2020 | Publicover et al. |

(Continued)

OTHER PUBLICATIONS

Pardes, Arielle. "Instagram Now Lets You Share Pics With Just 'CloseFriends'" (2018) Wired.com (Year: 2018).*

(Continued)

*Primary Examiner* — Marissa Thein
*Assistant Examiner* — Katherine A Barlow
(74) *Attorney, Agent, or Firm* — Maschoff Brennan (57) ABSTRACT

Sharing a digital ad between two or more users over a network. In one embodiment, a method may include presenting a digital ad to a first user on a first network device. The method may also include receiving from the first user a request to share the digital ad with a second user on a second network device. The method may further include sending the second user an invitation to view the digital ad and, in response to an acceptance of the invitation, presenting the digital ad to the second user on the second network device.

17 Claims, 7 Drawing Sheets

(56) References Cited

U.S. PATENT DOCUMENTS

| | | | |
|---|---|---|---|
| 2004/0243482 A1* | 12/2004 | Laut | G06Q 30/0601 705/26.1 |
| 2006/0156330 A1 | 7/2006 | Chiu | |
| 2006/0218036 A1 | 9/2006 | King et al. | |
| 2006/0271425 A1 | 11/2006 | Goodman et al. | |
| 2007/0265922 A1 | 11/2007 | Dumond et al. | |
| 2009/0112724 A1 | 4/2009 | Joo | |
| 2011/0119352 A1 | 5/2011 | Perov et al. | |
| 2011/0288913 A1 | 11/2011 | Waylonis et al. | |
| 2012/0036015 A1 | 2/2012 | Sheikh | |
| 2012/0150666 A1* | 6/2012 | Savic | G06Q 90/205 705/14.73 |
| 2013/0067035 A1 | 3/2013 | Amanat et al. | |
| 2013/0211944 A1* | 8/2013 | Momin | G06Q 30/06 705/26.2 |
| 2014/0297417 A1 | 10/2014 | Cusack | |
| 2014/0344080 A1 | 11/2014 | Rothman et al. | |
| 2014/0358260 A1 | 12/2014 | Burgin et al. | |
| 2015/0100403 A1 | 4/2015 | Roberts et al. | |
| 2015/0112778 A1* | 4/2015 | Feldman | G06Q 30/0269 705/14.16 |
| 2015/0363807 A1* | 12/2015 | Katz | G06Q 30/0224 705/14.1 |
| 2016/0321690 A1 | 11/2016 | Ma | |
| 2018/0300771 A1 | 10/2018 | Roger et al. | |

OTHER PUBLICATIONS

Aisch, Gregor et. al. "The Cost of Mobile Ads on 50 News Websites" (2015) NewYorkTimes.com (Year: 2015).*

Whitney, Margot. "YouTube TrueView Ads Can Now Include Interactive 'Cards'" WordStream.com (Year: 2018).*

Facebook Inc., "Connecting People to Brands and Products on Mobile", Dated Oct. 12, 2015.

Facebook Inc. "Recent Ad Activity Feature Allows Users to Revisit Ads", Dated Sep. 22, 2017.

U.S. Office Action in U.S. Appl. No. 16/914,023 dated Dec. 1, 2021.

\* cited by examiner

SYSTEM AND METHODS FOR A SHARED SHOPPING EXPERIENCE

CROSS-REFERENCE TO A RELATED APPLICATION

This patent application claims the benefit of and priority to U.S. Provisional Application Nos. 62/867,814, 62/867,816 and 62/867,818, all filed Jun. 27, 2019, which are incorporated by reference in the present disclosure in their entireties for all that they disclose.

BACKGROUND

In light of the increasing amounts of time that people spend online, digital advertising has become an important way for companies to promote their products and services. Many of the most popular websites and apps, including social media apps, video streaming apps, gaming apps, free apps, and web browser apps all include digital ads.

Digital ads, however, suffer from a number of deficiencies. First, most consumer interactions with digital ads cannot be shared over a network among a group of two or more consumers. Rather, digital ad experiences are usually limited to a single consumer that is viewing the digital ad on his or her own network device. In addition, when a consumer interacts with digital ads that are displayed on a host webpage, the consumer is usually led away from the host webpage to another webpage that is associated with the advertiser. This may be frustrating to consumers that want to interact with a digital ad without leaving the host webpage. In order to make digital ads more appealing to consumers and to increase the effectiveness of digital ads, improvements can be made to the way in which digital ads are presented to consumers.

The subject matter described in the present disclosure is not limited to embodiments that solve any disadvantages, address any opportunities and/or improvements, and/or that operate only in environments such as those described above. Rather, the preceding sections are only provided to illustrate one or more example technology areas and/or opportunities for improvements where some embodiments described in the present disclosure may be practiced.

SUMMARY

In one embodiment, a computer-implemented method for sharing a digital ad between two or more users over a network may be performed. The method may include presenting a digital ad to a first user on a first network device and receiving from the first user a request to share the digital ad with a second user on a second network device. The method may also include sending the second user an invitation to view the digital ad on the second network device and, in response to an acceptance of the invitation by the second user, presenting the digital ad to the second user on the second network device.

In some embodiments, the request to share the digital ad may be received from the first user through an input mechanism on the digital ad.

In some embodiments, the method may further include, in response to the receipt of the request to share the digital ad, displaying to the first user a listing of contacts that includes a current status of each individual included in the listing of contacts, and receiving input from the first user selecting the second user from the listing of contacts.

In some embodiments, the current status may provide an indication of which individuals included in the listing of contacts are online and which individuals included in the listing of contacts are not online.

In some embodiments, the invitation to view the digital ad is sent through a social media platform and provides an identification of the first user, a description of the digital ad, a message from the first user to the second user, and a link selectable by the second user to view the digital ad.

In some embodiments, the method may further include receiving input from the first user on the digital ad through the first network device and updating the digital ad presented on the second network device to display the input received through the first network device.

In some embodiments, the method may further include receiving from the first user a request to purchase a product featured in the digital ad, receiving from the first user a request to split the cost of the product featured in the digital ad, and splitting the cost of the product featured in the digital ad between the first user and the second user.

In another embodiment, a system for sharing a digital ad between two or more users over a network may include a memory storing program instructions and a processor coupled to the memory that is configured to execute the program instructions. The program instructions may be executable by the processor to present a digital ad to a first user on a first network device and receive from the first user a request to share the digital ad with a second user on a second network device. The program instructions may also be executable by the processor to send the second user an invitation to view the digital ad on the second network device and, in response to an acceptance of the invitation by the second user, present the digital ad to the second user on the second network device.

In some embodiments, the program instructions may also be executable by the processor to display to the first user a listing of contacts that includes a current status of each individual included in the listing of contacts and receive input from the first user selecting the second user from the listing of contacts.

In some embodiments, the program instructions may also be executable by the processor to receive input from the first user on the digital ad through the first network device and update the digital ad presented on the second network device to display the input received through the first network device.

In some embodiments, the program instructions may also be executable by the processor to receive, from the first user, a request to purchase a product featured in the digital ad, receive, from the first user, a request to split the cost of the product featured in the digital ad, and split the cost of the product featured in the digital ad between the first user and the second user.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Digital ads suffer from a number of deficiencies that take away from the effectiveness of online ad campaigns. For example, most consumer interactions with digital ads cannot be shared over a network among a group of two or more consumers. Rather, digital ad experiences are usually limited to a single consumer that is viewing the digital ad on his or her own network device. In addition, when a consumer interacts with digital ads that are displayed on a host webpage, the consumer is usually led away from the host webpage to another webpage that is associated with the advertiser. This may be frustrating to consumers that want to interact with a digital ad without leaving the host webpage.

Providing users with the ability to share a digital ad with others over a network may improve the users' experience with digital ads. For example, users in a shared ad session may give and receive advice or suggestions while they are viewing the digital ad. In addition, advertisers may benefit from shared ad sessions as these sessions may enable the advertiser to reach a greater number of consumers through the user's network of friends, without having to pay more to reach these people. In addition, allowing users to browse and purchase products without forcing the users to leave a webpage on which the digital ad appears may improve users' experiences with digital ads.

Some embodiments of the present disclosure describe systems and methods for presenting digital ads to consumers. According to some embodiments, a digital ad may be shared between two or more users over a network. According to some embodiments, a digital ad may provide product inventory information that is available in real time and allow a user to finalize the purchase of a product through the digital ad itself and without being required to leave a host webpage.

Figure 1:
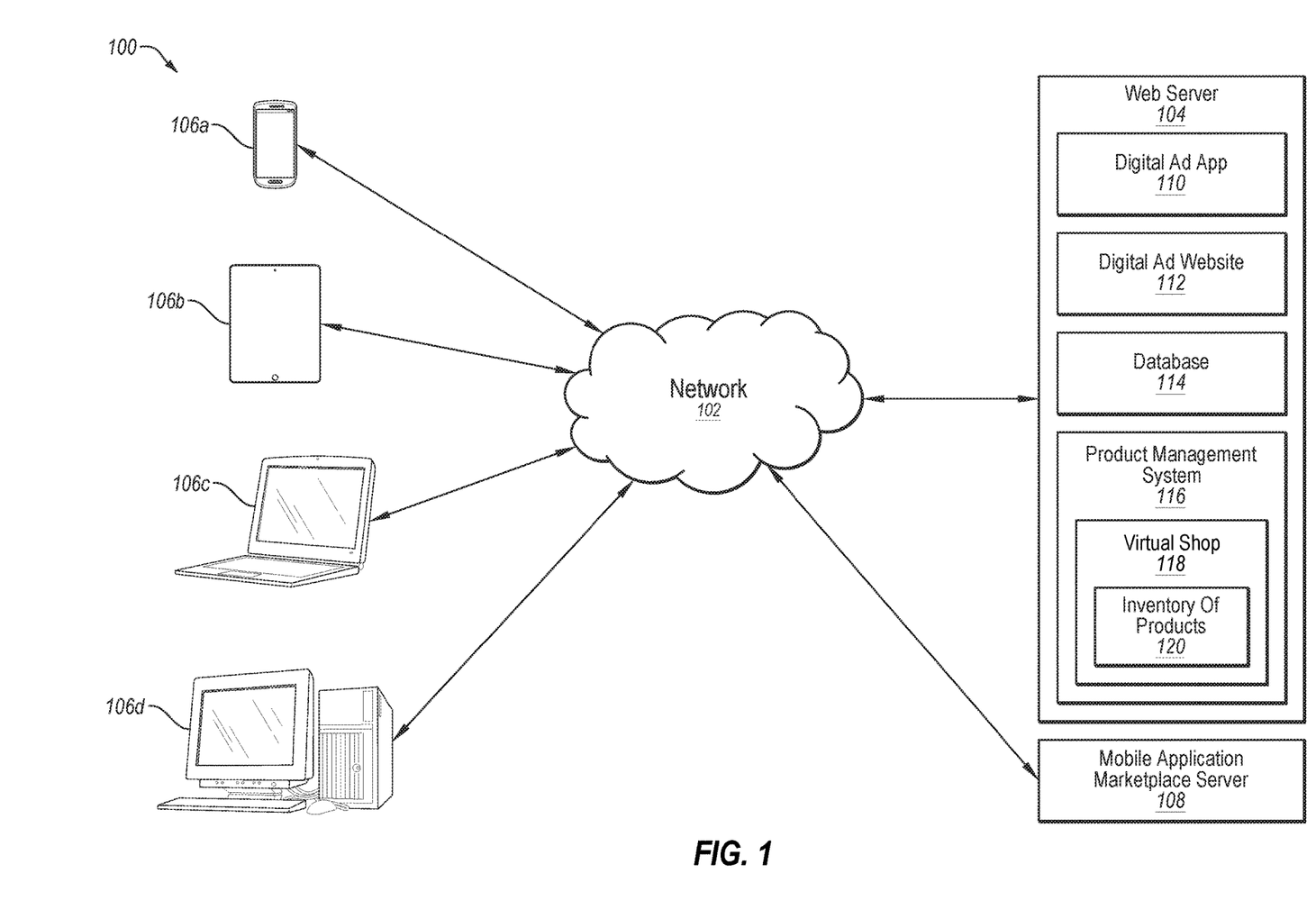
FIG. 1 illustrates an example system configured for sharing a digital ad between two or more users over a network.

Turning to the figures, FIG. 1 illustrates a system 100 that is configured to present digital ads to consumers on network devices. The system 100 may include a network 102, a webserver 104, network devices 106a-d, and a mobile application marketplace server 108.

In some embodiments, network 102 may be configured to communicatively couple webserver 104, network devices 106a-d, and mobile application marketplace 108 to one another using one or more network protocols, such as the network protocols available in connection with the World Wide Web. In some embodiments, network 102 may be any wired or wireless network, or combination of multiple networks, configured to send and receive communications between systems and devices. In some embodiments, network 102 may include a Personal Area Network (PAN), a Local Area Network (LAN), a Metropolitan Area Network (MAN), a Wide Area Network (WAN), a Storage Area Network (SAN), the Internet, or some combination thereof.

In some embodiments, network 102 may also be coupled to, or may include, portions of a telecommunications network, including telephone lines, for sending data in a variety of different communication protocols, such as a cellular network or a Voice over IP (VoIP) network.

In some embodiments, webserver 104 may be any computer system capable of communicating over network 102 to network devices 106a-d and/or mobile application marketplace server 108. Webserver 104 may make one or more mobile and/or web applications available to network devices 106a-d, including a digital ad app 110. Webserver 104 may also host one or more websites, such as web portals that include web pages, addressable at a particular web domain. These websites may include a digital ad website 112.

In some embodiments, digital ad app 110 may be a mobile app that is available for download through a server, such as mobile application marketplace server 108. Mobile application marketplace server 108 may include, for example, the APP STORE provide by Apple Computer and the ANDROID application website. Digital ad app 110 may alternatively be a web application that is hosted by webserver 104. In addition, digital ad app 110 may be a desktop app, which is downloaded and installed on a desktop computer.

Network devices 106a-d may be any device that can connect a user to network 102. For example, a network device may be a mobile phone (as shown in 106a), a tablet computer (as shown in 106b), a laptop computer (as shown in 106c), or a desktop computer (as shown in 106d). With regard to mobile phone 106a and tablet computer 106b, digital ad app 110 may be a mobile app that is downloadable from mobile application marketplace server 108 such as the APP STORE provide by Apple Computer or the ANDROID application website. With regard to laptop computer 106c and desktop computer 106d, digital ad app 110 may be provided through a web application that is hosted by webserver 104.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

In some embodiments, webserver 104 may be an ad publisher that presents digital ads to network devices 106a-d over network 102. An ad publisher may present digital ads through any suitable format. For example, digital ads may be delivered on a webpage and/or through digital ad app 110. Digital ad app 110 may be configured to present digital ads as popups or through banners presented on a variety of host pages, which may be displayed by network devices 106a-d. Host pages may include, for example, video players, social media websites, news websites, web applications and/or mobile applications, as well as game streaming platforms.

In some embodiments, a print ad (such as a billboard, cardboard display, product packaging . . . ) may include a QR code. This QR code may be tied to or paired with a digital ad for the same or similar product. A user may scan the QR code on the print ad with a mobile device and receive the corresponding digital ad.

Digital ads presented by webserver 104 may be static ads or they may be dynamic ads that include videos. In one embodiment, digital ads presented by webserver 104 may originate from a proprietary database 114 that is within web server 104. Alternatively, or in addition, digital ads displayed by webserver 104 may originate from an external ad database, such as an advertiser's database, that is in communication with webserver 104.

A user's first experience with an ad publisher and/or digital ad app 110 may include a guided procedure in digital ad website 112 to setup an account for the user. The user may initially login with a username and a temporary password that is generated by digital ad app 110. Once logged in, the user may choose a personalized password to access his or her account.

During the user's initial account setup, or through a subsequent interaction with digital ad website 112, a user may input and store details of one or more payment options. For example, a user may record numbers for one or more credit cards, bank accounts, PayPal accounts, Venmo accounts, etc. These accounts may be used to purchase products that are featured in digital ads presented by the ad publisher. During the initial account setup, or through a subsequent interaction with digital ad website 112, a user may also input and store details of the user's shipping and/or billing address(es).

In addition, during the user's initial account setup, or through a subsequent interaction with digital ad website 112, a user may select a security image that is displayed with the digital ads presented by webserver 104. This security image may be selected from a stock group of images that are provided as options. Alternatively, the user may upload a unique security image to his or her account. This security image may add an extra layer of security to avoid similar digital ads that may spawn to imitate the digital ads presented by webserver 104. When a security image is displayed with a digital ad, the user may have increased confidence that the digital ad originates with a trusted ad publisher and that the user will not need to enter payment information if the user has previously saved payment information to his or her account.

Webserver 104 may further include a product management system 116 that allows advertisers to create and manage a virtual shop 118 and an inventory of products 120. In some embodiments, this virtual shop 118 and inventory of products 120 can be served to network devices through one or more digital ads that are presented by digital ad app 110. In one embodiment, and as illustrated in FIG. 1, webserver 104 may host virtual shop 118 and inventory of products 120 through product management system 116. In alternative embodiments, a virtual shop and/or inventory may be external to webserver 104. For example, in situations where advertisers have an existing database containing production inventory, webserver 104 may include a software development kit that facilitates the connection between the digital ads served by webserver 104 and the advertiser's existing database.

A user may browse virtual shop 118, including inventory of products 120, through direct interactions with a digital ad. In some embodiments, the digital ads presented by digital ad app 110 may be dedicated ads that are configured for the architecture of product management system 116. Advertisers that choose to create and manage virtual shop 118 through product management system 116 may avoid the need for a dedicated website to successfully advertise and sell products. Advertising and selling products may be accomplished at the same time through the connection between digital ads and product management system 116.

The connection between digital ads and virtual store 118 may also allow digital ads to present product availability in real time. For example, a user may select a certain size of a product that is displayed in a digital ad on a network device. Upon receiving the user's selected size input, the digital ad may communicate with virtual shop 118 to obtain an availability status of the selected product in real time. For example, the digital ad may allow the user to choose the selected size if virtual shop 118 confirms that the product is available in inventory of products 120. On the other hand, if the selected product is not available in inventory of products 120, the user may be prevented from selecting the desired size. Alternatively, a message may be presented to the user through the digital ad notifying the user of the lack of inventory.

In addition to real time inventory, the connection between digital ads and virtual store 118 may further allow users to complete the purchase of a product featured in a digital ad through interaction with the digital ad itself. In other words, a user may purchase a product featured in a digital ad without being redirected to a separate online shop webpage. The connection between digital ads and virtual store 118 may include both reading and writing functions. For example, in the event that the user purchases a product featured in a digital ad, virtual shop 118 may receive notice of the purchase, and inventory of products 120 may be updated accordingly. Through this live connection between digital ads and inventory of products 120, digital ads can accurately represent in real time what is in stock at virtual shop 118.

Figure 2A:
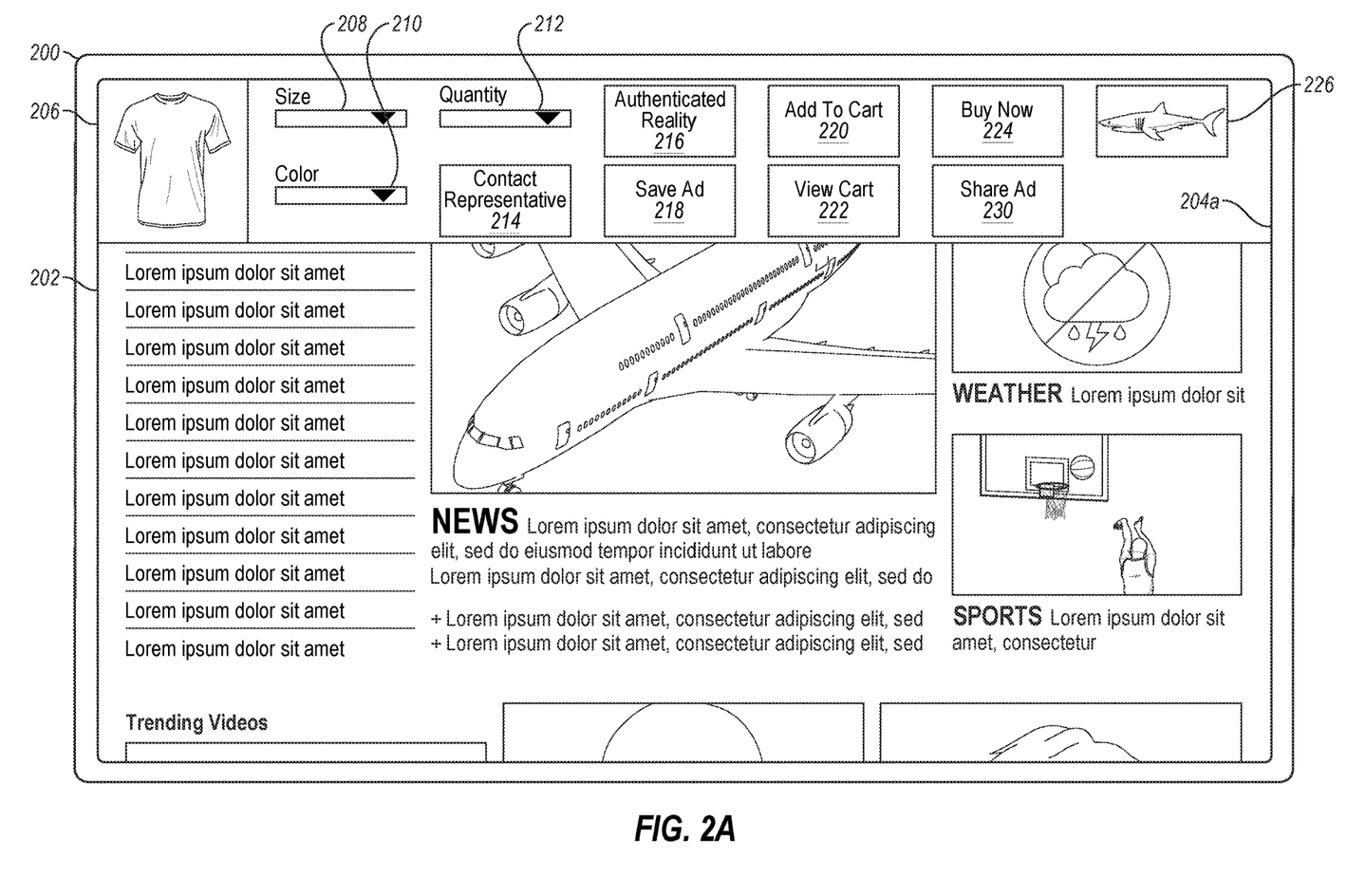
FIG. 2A illustrates a laptop computer displaying an exemplary digital ad.
Figure 2B:
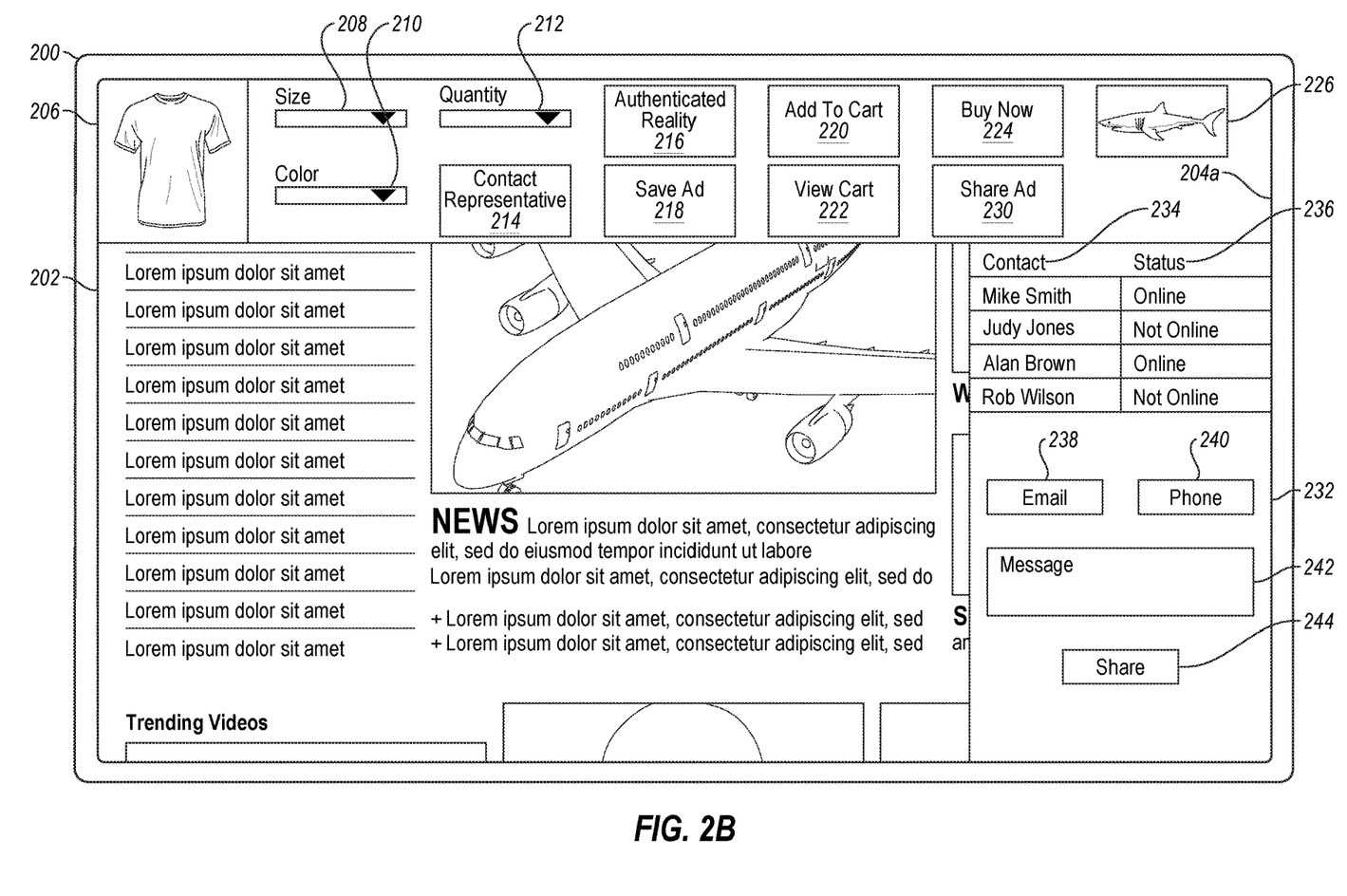
FIG. 2B illustrates the laptop computer of FIG. 2A displaying an exemplary directory feature of the digital ad.

FIGS. 2A and 2B illustrate a laptop computer 200. Laptop computer 200 is displaying a host webpage 202 and a digital ad 204*a*. Digital ad 204*a* is in the form of a banner that extends across the top of host webpage 202. In other embodiments, a digital ad may extend across different parts of a host webpage, or the digital ad may take up the entirety of a display on a network device. Digital ad 204*a* features a shirt 206. Digital ad 204*a* also includes a plurality of user input mechanisms. For example, shirt 206 may include a link that, if selected by the user, directs the user away from host webpage 202 and to an advertiser's webpage.

Digital ads may include any number and type of additional user input mechanisms, including buttons, switches, sliders, drop-down menus, text boxes, etc. For example, digital ad 204*a* includes a first drop-down menu 208 that allows a user to select a size of shirt 206, a second drop-down menu 210 that allows a user to select a color of shirt 206, and a third drop-down menu 212 that allows a user to select a quantity of shirt 206 that the user desires to purchase.

The type and quantity of user input mechanisms provided on a digital ad may depend on the product featured in the digital ad. For example, because digital ad 204*a* features a shirt 206, user input mechanisms that allow a user to select a size, color, and quantity are provided. However, with regard to digital ads that feature an automobile, the user input mechanisms may allow a user to select a year, mileage, price, and other related options.

Digital ad 204*a* may be hosted by a webserver that includes a product management system. This product management system may include, for example, a virtual shop and/or an inventory of products that is managed by an advertiser who is responsible for fulfilling any orders of shirt 206. A connection between digital ad 204*a* and a product management system may allow digital ad 204*a* to present product availability to the user of laptop computer 200 in real time. For example, using the first drop-down menu 208, a user may select a "small" size of shirt 206. Upon receiving this input, digital ad 204*a* may request an inventory check through a product management system at the webserver that is presenting digital ad 204*a*. If product inventory database confirms that a small size of shirt 206 is available in stock, the user may be allowed to proceed with other options. Alternatively, if a small size of shirt 206 is not available in stock, the user may be prevented from selecting this size in the drop-down menu and/or the user may be presented with a notice that the selected size is not currently available. This same process may be followed for any color selections made through the second drop-down menu 210 and quantity selections made through the third drop-down menu 212.

Digital ad 204*a* may also include a "contact representative" button 214. A user may select this button and be put in contact with a representative affiliated with the advertiser who is responsible for shirt 206. The user may be put in contact with the representative through any means of communication. For example, selecting button 214 may open a text message to be sent to the representative or initiate a chat session with the representative. Alternatively, selecting button 214 may initiate a voice or video call with the representative. Alternatively still, selecting button 214 may open an email message to be sent to the representative. In addition, selection button 214 may simply request that a representative contact the user. In this embodiment, the user may specify the way in which he or she prefers to be contacted by the representative. For example, the user may request a phone call, a text message, an email message, etc.

If the user has an account with an ad publisher, the request for contact from a product representative may be sent through the ad publisher. Requesting the contact from a product representative in this way may avoid sharing the user's contact information (phone number, email address, etc). This may be useful in situations where the user does not want to receive future unsolicited messages from the advertiser.

Digital ad 204*a* may also include an "augmented reality" button 216. A user may select this button to view a product featured in a digital ad in a virtual reality environment. For example, in one embodiment, the product featured in a digital ad may be a wearable product. A user may select an augmented reality button to virtually "try on" the wearable product featured in the ad. In another embodiment, the product featured in a digital ad may be a furniture product. A user may select an augmented reality button to virtually display the furniture product in a staging area. For example, the user may virtually position the furniture product in an area within the user's own home to see what it would look like if purchased and actually placed in a selected location. In another embodiment, the product featured in a digital ad may be a seat at a stadium or theater. A user may select an augmented reality button to virtually display the view from the seat. For example, the user may be presented with a 360 degree panorama view from the seat. With regard to digital ad 204*a*, a user may select augmented reality button 216 to virtually try on shirt 206.

When certain products are featured in digital ads, augmented reality button 216 may be replaced by a "demo product" button. For example, when the product featured by a digital is an app or a video game or another product that allows some user interaction, the demo product button may be selected, which allows the user to demo or try out the product. In one embodiment, the featured product may be a word processing software. Selecting the demo product button may allow the user to interact with a limited version of the product. In another embodiment, the featured product may be a game. Selecting the demo product button may allow the user to play a limited version of the game. These interactions may occur within the digital ad itself. The digital ad, during these demos, may remain the same size or expand to allow for a better user interaction and experience.

Digital ad 204*a* may also include a "save ad" button 218. Save ad button 218 may allow a user to save a digital ad and view that ad at a later time either on the same device or a different device. The digital ad may be saved through a product management system on a webserver of an ad publisher. For example, with regard to digital ad 204*a*, a user may be interested in shirt 206, but may not have the time to finalize a purchase at the moment that digital ad 204*a* is displayed on laptop computer 200. The user may select save ad button 218 and view ad 204*a* at a later time either on laptop computer 200 or on a different device. If the user has initiated some interaction with digital ad 204*a*, for example, if a size or color has been selected, these interactions may be saved with ad 204*a* such that when the user views digital ad 204*a* at a later time, these selections remain present on the digital ad.

Digital ad 204*a* may also include an "add to cart" button 220. Add to cart button 220 may save a product featured in a digital ad within a user's virtual shopping cart for later payment. For example, if a user has decided that he or she wants to buy shirt 206, but he or she wants to view additional digital ads before finalizing the purchase of shirt 206, the user may select the add to cart button 220. Similarly, digital ad 204*a* may include a "view cart" button 222. A user may select view cart button 222 to see what products the user has already placed in his or her virtual cart. The view of the user's cart may be placed within the boundaries of digital ad 204*a* or it may extend into a portion of host webpage 202.

Digital ad 204*a* may also include a "buy now" button 224. A user may select buy now button 224 to finalize a transaction to purchase shirt 206. A user may be able to finalize the purchase of shirt 206 without being redirected away from host webpage 202. To the extent that the user has an account with the publisher of digital ad 204*a*, the user may be able to finalize the purchase of shirt 206 simply by selecting buy now button 224. This may require that the user have previously input and stored payment details with the publisher of digital ad 204*a* (for example, through the account setup process described above). Alternatively, a user may be prompted to enter his or her payment details when the buy now button 224 is selected.

Digital ad 204*a* may also include a security image 226. Security image 226 may have been selected by the user during an initial setup of the user's account with the ad publisher or through a subsequent interaction with a webpage associated with the ad publisher. A user may select security image 226 from a stock group of images presented to the user or security image 226 may be an image that the user uploaded to his or her account. Security image 226 may provide the user with some assurance that the digital ad originates with a known and trusted ad publisher.

Digital ad 204*a* may also include a "share ad" button 230. A user may select share ad button 230 to share digital ad 204*a* with one or more others. When a user selects share ad button 230, a directory of the user's contacts may be displayed on laptop computer 200. For example, FIG. 2B illustrates laptop computer 200 with an exemplary directory 232, which may be displayed after a user selects share ad button 230.

Directory 232 may include individuals in a contacts list 234 that a user has selected to include within directory 232. For example, during an initial setup of the user's account with the ad publisher or through a subsequent interaction with a webpage associated with the ad publisher, the user may add friends and family that also have an account with the ad publisher to contacts list 234. For example, with regard to directory 232, the user has four individuals included in contacts list 234. The user may select one or more of the individuals from contacts list 234 with whom to share digital ad 204*a*.

In addition to a contacts list 234, directory 232 may also include a status 236 for each individual in contacts list 234. Contacts list 236 may provide information on the availability of the individuals in contacts list 234. For example, status 236 may indicate whether each individual in contacts list 234 is online. In addition or alternatively, status 236 may indicate whether the individuals in contacts list 234 have a digital ad app installed and running on a network device. This information may be provided through written characters, as in directory 232. Alternatively, a symbol may be used to indicate the status of the individuals in contact list 234. This symbol may be a colored symbol where a green symbol may indicate that an individual is online and a red symbol may indicate that an individual is not online.

Directory 232 may further include an additional mechanism for sharing an ad with an individual that is not included within the user's contacts list 234. For example, directory 232 may include an email field 238 and a phone field 240. A user may input an email address in email field 238 to send an invitation to share digital ad 204*a* with the individual at the specified email address. Similarly, the user may input a telephone number into phone field 240 to share digital ad 204*a* with the individual at the specified phone number. Individuals contacted through email field 238 and/or phone field 240 may lack an account with the ad publisher.

Directory 232 may also include a message field 242. A user wanting to share digital ad 204*a* may include a brief message within message field 242. Any message written within message field 242 may accompany the invitation to share digital ad 204*a*.

Finally, directory 232 may include a "share" button 244. A user may select share button 244 to send an ad share invitation to the selected individual(s). The ad share invitation may be sent to the selected individual(s) via one or more electronic communications. For example, the share invitation may be sent via a text message, email message, push notification, or through another electronic communication. Sharing an ad between individuals that have a digital ad app downloaded and installed may be performed through the digital ad app itself. In addition, sharing an ad between individuals may be performed through a social media platform. For example, if two individuals have accounts on the same social media platform, a digital ad may be shared between them through an ad sharing feature of the social media platform.

Figure 2C:
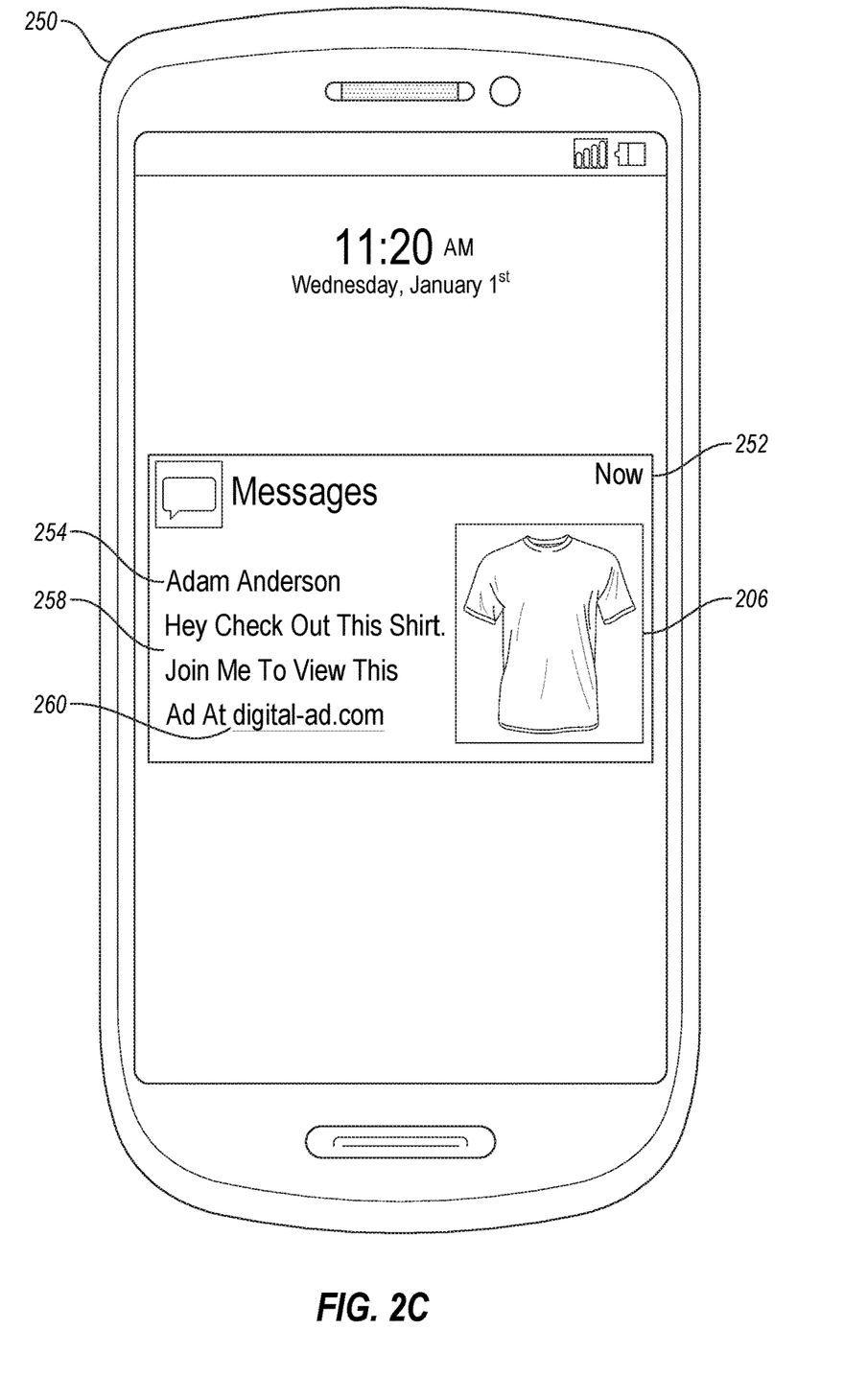
FIG. 2C illustrates a mobile device displaying a text message invitation to share the digital ad displayed in FIGS. 2A and 2B.

The ad share invitation that is received by a selected individual may include the identity of the user sending the ad share invitation, a description of the digital ad, a message from the user, and a link to view the digital ad. For example, FIG. 2C illustrates a mobile device 250 that has received an invitation from the user of laptop computer 200 to share digital ad 204*a*. A text message 252 is displayed on mobile device 250. Text message 252 includes the identity of the sender 254 (in this example, Adam Anderson), a description of the digital ad (a picture of shirt 206), a message 258, and a link 260 to digital ad 204*a*.

To accept the invitation and initiate the ad share session, the user of mobile device 250 may select link 260. By selecting link 260, the user of mobile device 250 and the user of laptop computer 200 may be able to view and interact with digital ad 204*a* at the same time. In some embodiments, the shared digital ad may be viewed as a popup on the ad publisher's webpage or in another tab in the same web browser. Alternatively, the shared ad may be viewed through a digital ad app or within a banner on a host webpage.

Figure 2D:
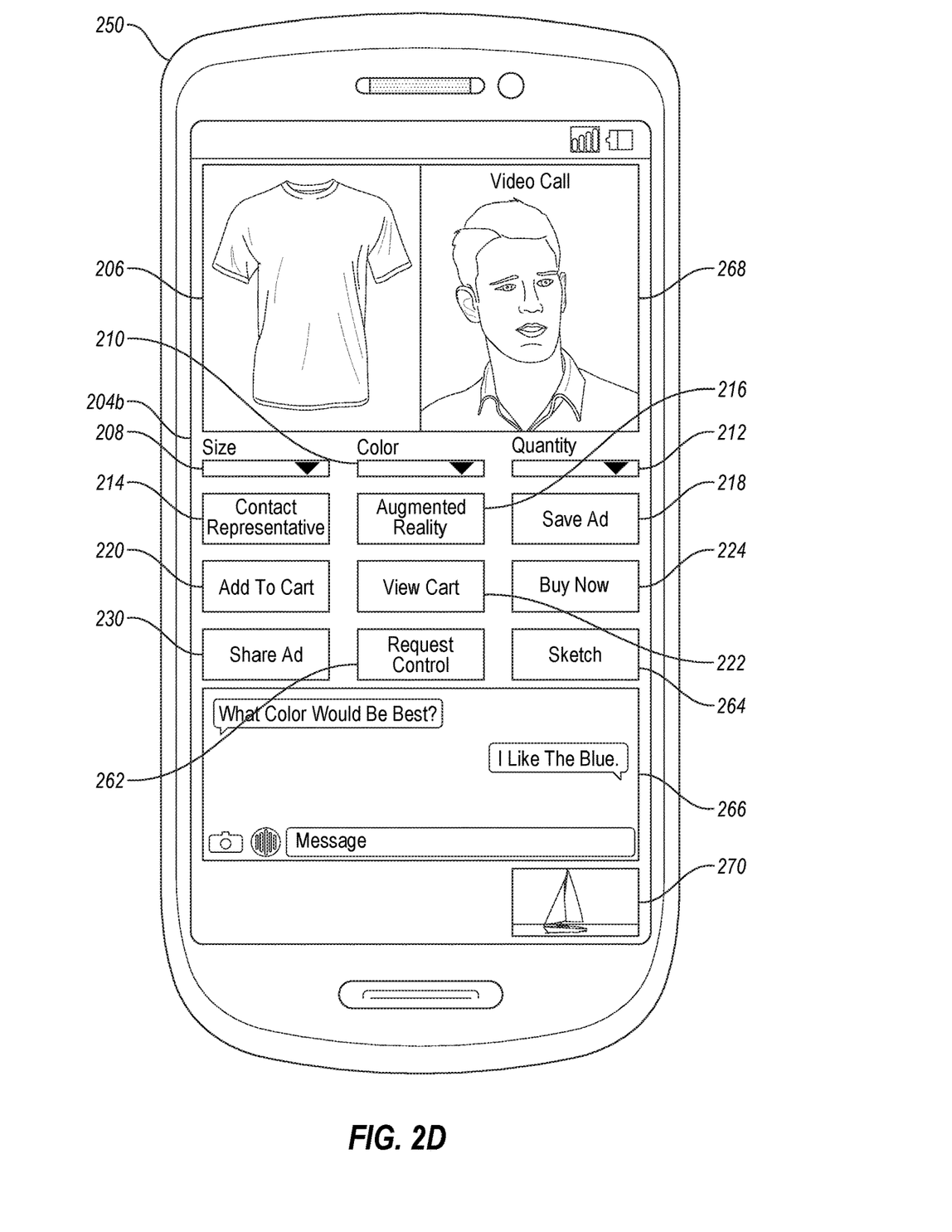
FIG. 2D illustrates the mobile device of FIG. 2C displaying the exemplary digital ad in a shared ad session with the laptop computer of FIGS. 2A and 2B.

FIG. 2D illustrates mobile device 250 that has digital ad 204*b* displayed. Digital ad 204*b* may be displayed on mobile device 250 after the user of mobile device 250 has selected link 260 in text message 252 (illustrated in FIG. 2C). Thus, the user of laptop 200 and mobile device 250 may be engaged in a shared ad session.

During this shared ad session, laptop computer 200 and mobile device 250 may display the same digital ad; however, there may be some formatting differences between the digital ads based on the devices on which they are presented. For example, digital ad 204*a* is displayed on laptop computer 200 and digital ad 204*b* is displayed on mobile device 250. Digital ad 204*b* may feature shirt 206 and many of the same user input functions as digital ad 204*a*. For example, like digital ad 204*a*, digital ad 204*b* may include first drop-down menu 208 that allows a user to select a size of shirt 206, second drop-down menu 210 that allows a user to select a color of shirt 206, and third drop-down menu 212 that allows a user to select a quantity of shirt 206 to purchase. Like digital ad 204*a*, digital ad 204*b* may also include contact representative button 214, augmented reality button 216, save ad button 218, add to cart button 220, view cart button 222, buy now button 224, and share ad button 230.

During a shared ad session, additional input mechanisms may appear on a digital ad. For example, digital ad 204*b* further includes a "request control" button 262 and a "sketch" button 264. A chat field 266 and a video call field 268 are also present on digital ad 204*b*. These additional buttons and fields may appear on digital ad 204*a* once the shared ad session has been initiated. These additional buttons and field are described in further detail hereafter.

The common user input features on digital ad 204*b* may function in the same ways as described in connection with digital ad 204*a*. However, during a shared ad session, some of these input mechanisms may include additional functionality. For example, any interaction that one individual has with a digital ad may appear on the digital ads displayed to others in the shared ad session. Thus, with regard to digital ad 204*a* and 204*b*, if the user of laptop computer 200 makes a selection to one or more of drop-down menus 208, 210, and/or 212 in digital ad 204*a*, these selections will be displayed to the user of mobile device 250 on digital ad 204*b*. Similarly, if the user of mobile device 250 makes a selection to one or more of drop-down menus 208, 210, and/or 212 in digital ad 204*b*, these selections will be displayed to the user of laptop computer 200 on digital ad 204*a*.

In some embodiments, all individuals in a shared ad session may interact with a digital ad at any time through the input mechanisms that are displayed. In some embodiments, only the individual that initiates the shared ad session may interact with a digital ad while the other individuals are simply spectators. In other embodiments, control over the input mechanisms may be held by any of the individuals in a shared ad session, but only one individual may hold this control at a given time. To change interactive control between individuals in a shared ad session, the digital ad may include another input mechanism that allows an individual to request interactive control of the digital ad. For example, digital ad 204*b* includes a "request control" button 262 which, when selected by the user of mobile device 250, provides the user of mobile device 250 with interactive control over digital ad 204*b* such that any selections that are made on digital ad 204*b* will also be reflected on digital ad 204*a*. The user of mobile device 250 may retain interactive control over the digital ad until another individual in the shared ad session, for example, the user of laptop computer 200, selects the request control button 262 that is displayed on digital ad 204*a*. In some embodiments, an individual with interactive control of the digital ad may grant or deny another individual's request to take interactive control of the digital ad. For example, when an individual selects the request control button 262, the individual with interactive control of the digital ad may be presented with an option to either grant or deny the request.

The other buttons in digital ads 204*a* and 204*b* may function in a similar manner as the drop-down menus, where input by one individual is shared among all of the individuals in the shared ad session. For example, if one individual in a shared ad session (for example, an individual with interactive control) selects save ad button 218, the digital ad may be saved for each of the individuals in the shared ad session. Similarly, if one individual in a shared ad session (for example, an individual with interactive control) selects add to cart button 220, shirt 206 may be added to the carts of each individual in the shared ad session.

In alternative embodiments, a user's selection of one or more buttons in a shared ad session may not be shared among all individuals in a shared ad session. For example, if the user of mobile device 250 selects add to cart button 220, shirt 206 may be added to the cart of only the user making the selection, but not to the carts of others in the shared ad session. Similarly, if the user of mobile device 250 selects share ad button 230, that user's contact list may appear on mobile device 250, but not on laptop computer 200. This may allow individuals in a shared ad session to invite one or more additional individuals from their own contact lists into the shared ad session. Alternatively, share ad button 230 may allow an individual to initiate a new shared ad session with a different individual or group of individuals.

If one individual in a shared ad session selects an augmented reality button, the virtual reality environment view of the product may be displayed to each of the individuals in the shared ad session. In the case of shirt 206, if the user of laptop computer 200 selects augmented reality button 216, the user of laptop computer 200 may virtually try on shirt 206. The view of this user virtually trying on shirt 206 may be displayed to all other individuals in the shared ad session. In addition, selecting augmented reality button 216 may allow both the user of laptop computer 200 and the user of mobile device 250 to virtually try on shirt 206. Both of these users may be presented with a view of themselves and/or the other user virtually trying on shirt 206. For example, the user of laptop computer 200 may see himself virtually trying on shirt 206, he may see the user of mobile device 250 virtually trying on shirt 206, or he may see both himself and the user of mobile device 250 virtually trying on shirt 206.

If one individual in a shared ad session selects a buy now button, that individual may purchase the product alone. In alternative embodiments, an option to share the cost of the product among the individuals in the share ad session may be presented. For example, if the user of mobile device 250 selects buy now button 224, the user may be prompted to select whether the user wants to pay for shirt 206 alone or whether the cost of shirt 206 is to be split between the user of mobile device 250 and the user of laptop computer 200. If the user of mobile device 250 chooses to pay for shirt 206 alone, he or she may be prompted to input payment details to finalize the transaction. Alternatively, if the user of mobile device 250 chooses to split the cost of shirt 206 with the user of laptop computer 200, the user of mobile device 250 may be further prompted to specify the amount that each user is to pay. This amount may be specified by inputting a percentage that each user will pay (for example, each may pay 50%) or by specifying an amount that each user is to pay (for example, is the price of the shirt is $30, it may be specified that one user will pay $10 and the other will pay $20). Once the amount that each user is to pay is settled, each user may be prompted to pay the specified amount using a payment mechanism that is saved in the user's account or by providing alternative payment details. In some embodiments, after the user of mobile device 250 selects a split purchase option, the user of laptop computer 200 may be presented with an option to either grant or deny the split purchase option.

Digital ad 204*b* also includes several mechanisms to facilitate communication between individuals in a shared ad session. For example, sketch button 264 may allow the user of mobile device 250 to make markings over the top of digital ad 204*b*. For example, the user of mobile device 250 may use his or her finger to draw symbols or write words on digital ad 204*b*. These sketches may also appear on digital ad 204*a*. In order to allow these sketches to appear over the top of digital ad 204*b*, when sketch button 264 is selected, all other input mechanisms on digital ad 204*b* may be switched to an inactive state. Sketch button 264, or another input mechanism, may be selected again to delete the sketches and to turn the input mechanisms on digital ad 204*b* back into an active state.

Digital ad 204*b* also includes chat field 266. The user of mobile device 250 and the user of laptop computer 200 may use chat field 266 to send messages to each other. Alternatively, or in addition, the user of mobile device 250 and the user of laptop computer 200 may communicate via a phone call or video conference call. For example, digital ad 204*b* includes video call field 268 where a video call has been initiated with the user of laptop computer 200.

Finally, digital ad 204*b* may include a security image 270. Security image 270 may have been selected by the user of mobile device 206 during an initial setup of the user's account with the ad publisher or through a subsequent interaction with a webpage associated with the ad publisher.

Figure 3:
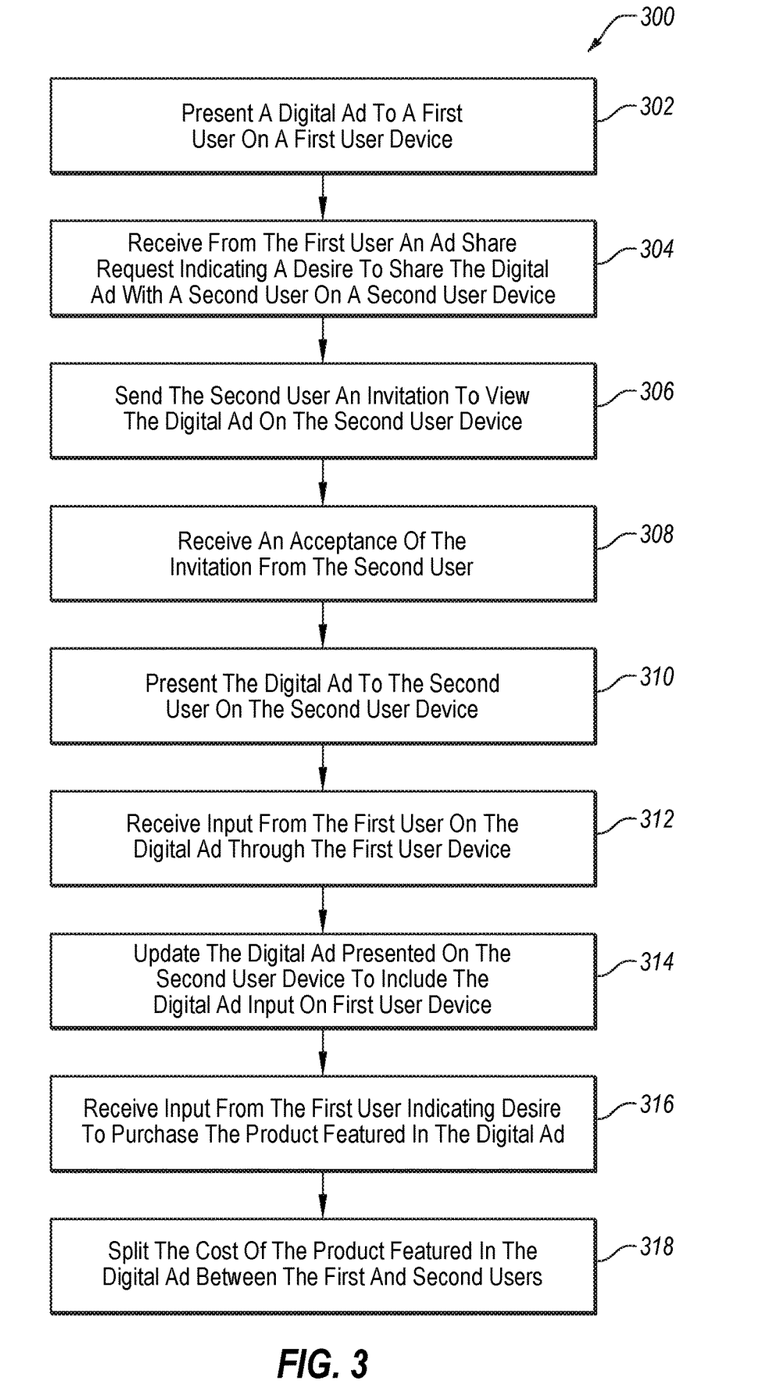
FIG. 3 is a flowchart of an example method for sharing a digital ad between two or more users over a network.

FIG. 3 is a flowchart of an example method 300 for sharing a digital ad between two or more users over a network. The method 300 may include, at action 302, presenting a digital ad to a first user on a first user device. The first user device may be any device configured to communicate over a network. For example, first user device may be a mobile device, a tablet computer, a laptop computer, a desktop computer, or another network capable device.

The first digital ad may be presented to the first user by an ad publisher. The digital ad may be, for example, a popup ad or a banner ad that is displayed on a host webpage. The digital ad may take up a portion of or all of a display of the first user device. The digital ad may feature a product and include a number of user input mechanisms. Depending on the product featured in the digital ad, the user input mechanisms may allow the first user to select options relating to the product. For example, if the product is a wearable item, the user input mechanisms may allow the user to select a size, color, and other options of the item. If the product featured in the digital ad is a car, the user input mechanisms may allow the user to select a year, mileage, color, and other options.

In some embodiments, the digital ad may be connected to a product management system on a webserver of the ad publisher. The product management system may include or be in communication with an inventory database of the advertiser responsible for fulfilling any orders of the product featured in the digital ad.

Through the connection between the digital ad and the product management system, product inventory may be confirmed on the digital ad in real time. For example, if the product featured in the digital ad is a dress, and the user, through one or more input mechanisms, selects a small size, the inventory database may be checked to confirm whether a small size of the dress featured is available in stock. If it is, the user may be allowed to place the product in a virtual cart or proceed with the purchase of the dress. If the dress is not in stock, the user may be prevented from selecting the small size and/or be provided with a message that this size is not in stock. If the user purchases the dress, the purchase may be communicated to the inventory database so that the inventory database may be updated to reflect the purchase. Through this bidirectional communication between the digital ad and the inventory database, digital ads may provide product availability in real time.

The connection between the digital ad and the product management system may also allow the first user to purchase the featured product through the digital ad itself and without requiring the user to leave any host webpage on which the digital ad may be presented. Through this connection, advertisers may avoid the need for a dedicated website to successfully advertise and sell products.

The method 300 may include, at action 304, receiving from the first user an ad share request indicating a desire to share the digital ad with a second user on a second user device. The ad share request may be received from the first user through one or more user input mechanisms on the digital ad. For example, the ad share request may be a button that the first user selects. Upon requesting to share the digital ad, the user may be presented with a directory that includes names of individuals that the first user has selected to be included in the directory. The directory may also include an indication of whether the individuals included within the directory are available. For example, the directory may indicate whether the individuals are currently online.

The first user may select one or more of the individuals from the directory with whom to share the digital ad. If the first user wants to share the digital ad with someone that is not included in the directory, the user may input an email address, phone number, or other information identifying the individual with whom the first user would like to share the digital ad. The first user may include a brief message to be sent with the invitation to share the digital ad.

The method 300 may include, at action 306, sending the second user an invitation to view the digital ad on the second user device. This invitation may be sent through any communication mechanism. For example, the invitation may be sent as a text message, an email message, push notification, or through another communication mechanism. In addition, the share ad invitation may be sent through a social media platform. For example, if two individuals have accounts on the same social media platform, an invitation to share a digital ad may be sent through an ad sharing feature of the social media platform. The invitation may include a link to a webpage where the second user may view the digital ad.

The method 300 may include, at action 308, receiving an acceptance of the invitation from the second user. The second user may accept the invitation simply by selecting the link included in the invitation to view the digital ad. In alternative embodiment, additional input mechanisms may be provided for the second user to either accept or reject the invitation.

The method 300 may include, at action 310, presenting the digital ad to the second user on the second user device. The digital ad may be presented on a webpage at the link included in the invitation to view the digital ad.

The method 300 may include, at action 312, receiving input from the first user on the digital ad through the first user device. The input received from the first user may relate to the product featured in the digital ad. For example, if the product featured in the digital ad is a wearable item such as a hat, the input received may include a size of the hat and/or color of the hat.

The method 300 may include, at action 314, updating the digital ad presented on the second user device to include the input from the first user on the digital ad. For example, if the first user selected a size and/or color of a hat featured in the digital ad, the selected size and/or color selected by the first user on the first user device may be displayed to the second user in the digital ad on the second user device. Thus, selections made by any individual in a shared ad session may be viewed by all other individuals in the shared ad session.

In some embodiments, all individuals in a shared ad session may make selections on the digital ad at the same time. In alternative embodiment, only certain individuals may make selections on the digital ad. For example, in some embodiments, only the user that initiated the shared ad session may be able to make selections on the digital ad. In other embodiments, only an individual with interactive control may make selections on the digital ad. This interactive control may be transferred between individuals in a shared ad session. For example, a request control button may be presented on the digital ads to each individual in the shared ad session. Any individual in the shared ad session may select the request control button and have or be granted interactive control of the ad. This user may retain interactive control of the ad until another individual in the shared ad session selects the request control button and this request in granted by the individual with interactive control. Alternatively, the individual with interactive control of the digital ad may deny another individual's request for interactive control.

The method 300 may include, at action 316, receiving input from the first user indicating a desire to purchase the product featured in the digital ad. The first user may provide this input through a buy now button on the digital ad. Upon receiving this input, the first user may be presented with the option of either paying for the product alone or splitting the cost of the product between all or some of the individuals in the shared ad session.

The method 300 may include, at action 318, splitting the cost of the product featured in the digital ad between the first and second users. The cost of the product may be split in any way. For example, a percentage of the cost may be assigned between the first and second users. For example, the cost may be split evenly between the first and second users or one user may pay for more than 50% of the cost while the other user pays less than 50% of the cost. Alternatively, a specific amount of the product cost may be allocated to the first and second users. In some embodiments, a request to split payment must be approved and may be denied by other individuals in the shared ad session.

Figure 4:
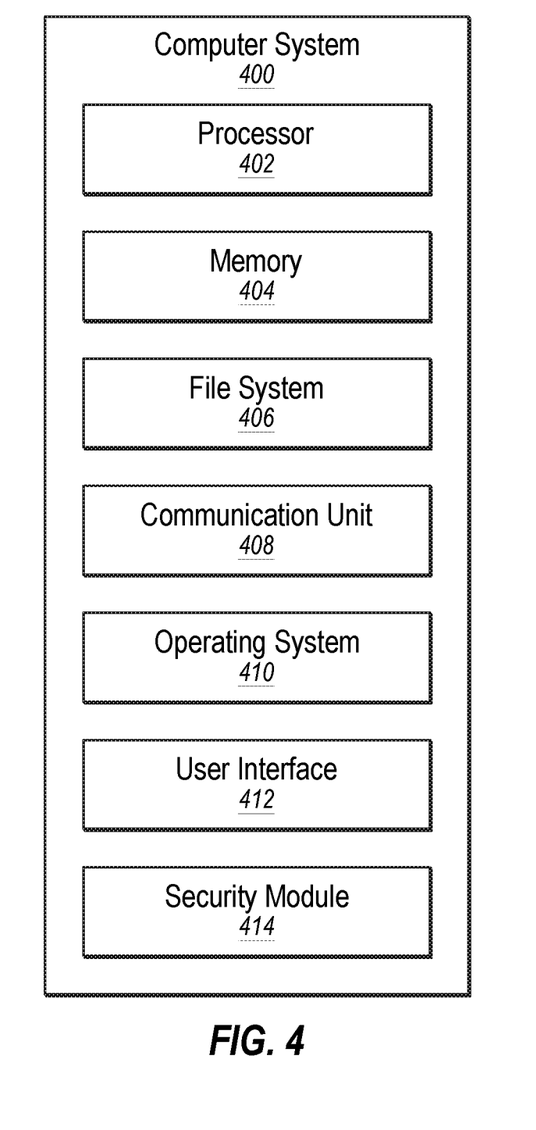
FIG. 4 illustrates an example computer system that may be employed in sharing a digital ad between two or more users over a network.

FIG. 4 illustrates an example computer system 400 that may be employed in sharing a digital ad between two or more users over a network. In some embodiments, the computer system 400 may be part of any of the systems or devices described in this disclosure. For example, the computer system 400 may be part of any of the webserver 104, the network devices 106 and the mobile application marketplace server 108 of FIG. 1.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of method 300 of FIG. 3. These computer-executable instructions may be included, for example, in the operating system 410, in one or more applications, such as the security module 414, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, a touchscreen, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the security module 414 may be part of the operating system 410 or may be part of an application of the computer system 400, or may be some combination thereof.

Modifications, additions, or omissions may be made to the computer system 400 without departing from the scope of the present disclosure. For example, although each is illustrated as a single component in FIG. 6, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for sharing a digital ad between two or more users over a network, the method comprising:
    presenting a digital ad on a host webpage over the network to a first user on a first network device, wherein the digital ad is presented within a banner that extends across at least a portion of the host webpage and the digital ad includes at least one input field;
    receiving from the first user a request to share the digital ad with a second user on a second network device, wherein the request to share the digital ad is received from the first user through an input mechanism on the digital ad within the banner without navigating away from the host webpage;
    in response to the receipt of the request to share the digital ad, displaying to the first user a listing of contacts without navigating away from the host webpage, wherein the listing of contacts includes a current status of each individual included in the listing of contacts, and wherein the current status provides an indication of which individuals included in the listing of contacts are online and which individuals included in the listing of contacts are not online;
    receiving input from the first user selecting the second user from the listing of contacts;
    sending the second user an electronic communication containing an invitation to view the digital ad on the second network device, the invitation including a link selectable by the second user to view the digital ad;
    in response to a selection of the link by the second user, presenting the digital ad over the network to the second user on the second network device, wherein, the digital ad is presented over the network simultaneously to the first user on the first network device and the second user on the second network device during a shared ad session such that the first and second users view the digital ad at the same time;
    receiving input from the first user through the first user device to the at least one input field; and
    updating, during the shared ad session, the digital ad presented to the second user on the second network device to include the input received from the first user.

2. The method as recited in claim 1, wherein the invitation to view the digital ad is sent through a social media platform and provides an identification of the first user, a description of the digital ad, and a message from the first user to the second user.

3. The method as recited in claim 1 further comprising:
receiving, from the first user, a request to purchase a product featured in the digital ad;
receiving, from the first user, a request to split the cost of the product featured in the digital ad; and
splitting the cost of the product featured in the digital ad between the first user and the second user.

4. The method as recited in claim 1, further comprising:
assigning an initial interactive control of the digital ad to the first user on the first user device;
transferring interactive control of the digital ad to the second user on the second network device;
receiving input from the second user through the second user device to the at least one input field; and
updating, during the shared ad session, the digital ad presented to the first user on the first network device to include the input received from the second user.

5. The method as recited in claim 1, wherein the host webpage is a video player, a social media website, a news website, a web application, a mobile application, or a game streaming platform.

6. The method as recited in claim 1, wherein the subject matter of the host webpage is unrelated to the subject matter of the digital ad.

7. A system for sharing a digital ad between two or more users over a network comprising:
a memory storing program instructions;
a processor coupled to the memory and configured to execute the program instructions, wherein the program instructions are executable by the processor to:
present a digital ad on a host webpage over the network to a first user on a first network device, wherein the digital ad is presented within a banner that extends across at least a portion of the host webpage and the digital ad includes at least one input field;
receive from the first user a request to share the digital ad with a second user on a second network device, wherein the request to share the digital ad is received from the first user through an input mechanism on the digital ad within the banner without navigating away from the host webpage;
in response to the receipt of the request to share the digital ad, display to the first user a listing of contacts without navigating away from the host webpage, wherein the listing of contacts includes a current status of each individual included in the listing of contacts, and wherein the current status provides an indication of which individuals included in the listing of contacts are online and which individuals included in the listing of contacts are not online;
receive input from the first user selecting the second user from the listing of contacts;
send the second user an electronic communication containing an invitation to view the digital ad on the second network device, the invitation including a link selectable by the second user to view the digital ad;
in response to a selection of the link by the second user, present the digital ad over the network to the second user on the second network device, wherein, the digital ad is presented over the network simultaneously to the first user on the first network device and the second user on the second network device during a shared ad session such that the first and second users view the digital ad at the same time;
receive input from the first user through the first user device to the at least one input field; and
update, during the shared ad session, the digital ad presented to the second user on the second network device to include the input received from the first user.

8. The system as recited in claim 7, wherein the invitation to view the digital ad is sent through a social media platform and provides an identification of the first user, a description of the digital ad, and a message from the first user to the second user.

9. The system as recited in claim 7, wherein the program instructions are further executable by the processor to:
receive, from the first user, a request to purchase a product featured in the digital ad;
receive, from the first user, a request to split the cost of the product featured in the digital ad; and
split the cost of the product featured in the digital ad between the first user and the second user.

10. The system as recited in claim 7, wherein the program instructions are further executable by the processor to:
assign an initial interactive control of the digital ad to the first user on the first user device;
transfer interactive control of the digital ad to the second user on the second network device;
receive input from the second user through the second user device to the at least one input field; and
update, during the shared ad session, the digital ad presented to the first user on the first network device to include the input received from the second user.

11. The system as recited in claim 7, wherein the host webpage is a video player, a social media website, a news website, a web application, a mobile application, or a game streaming platform.

12. The system as recited in claim 7, wherein the subject matter of the host webpage is unrelated to the subject matter of the digital ad.

13. A computer-implemented method for sharing a digital ad between two or more users over a network, the method comprising:
presenting a digital ad on a host webpage over the network to a first user on a first network device, wherein the digital ad is presented within a banner that extends across at least a portion of the host webpage and the digital ad includes at least one input field;
receiving from the first user a request to share the digital ad with a second user on a second network device;
sending the second user an electronic communication containing an invitation to view the digital ad on the second network device, the invitation including a link selectable by the second user to view the digital ad;
in response to a selection of the link by the second user, presenting the digital ad over the network to the second user on the second network device, wherein, the digital ad is presented over the network simultaneously to the first user on the first network device and the second user on the second network device during a shared ad session such that the first and second users view the digital ad at the same time;
assigning an initial interactive control of the digital ad to the first user on the first user device;
receiving input from the first user through the first user device to the at least one input field;
updating, during the shared ad session, the digital ad presented to the second user on the second network device to include the input received from the first user;
transferring interactive control of the digital ad to the second user on the second network device;

receiving input from the second user through the second user device to the at least one input field; and updating, during the shared ad session, the digital ad presented to the first user on the first network device to include the input received from the second user.

14. The method as recited in claim 13, wherein the invitation to view the digital ad is sent through a social media platform and provides an identification of the first user, a description of the digital ad, and a message from the first user to the second user.

15. The method as recited in claim 13 further comprising:

receiving, from the first user, a request to purchase a product featured in the digital ad;

receiving, from the first user, a request to split the cost of the product featured in the digital ad; and splitting the cost of the product featured in the digital ad between the first user and the second user.

16. The method as recited in claim 13, wherein the host webpage is a video player, a social media website, a news website, a web application, a mobile application, or a game streaming platform.

17. The method as recited in claim 13, wherein the subject matter of the host webpage is unrelated to the subject matter of the digital ad.

\* \* \* \* \*